(12) United States Patent
Melton

(10) Patent No.: US 7,066,479 B2
(45) Date of Patent: Jun. 27, 2006

(54) AXLE HOUSING SUSPENSION SEAT ASSEMBLY

(75) Inventor: Patrick B. Melton, Horseshoe, NC (US)

(73) Assignee: ArvinMeritor Technology, LLC, Troy, MI (US)

( * ) Notice: Subject to any disclaimer, the term of this patent is extended or adjusted under 35 U.S.C. 154(b) by 259 days.

(21) Appl. No.: 10/421,116

(22) Filed: Apr. 23, 2003

(65) Prior Publication Data

US 2004/0212166 A1  Oct. 28, 2004

(51) Int. Cl.
*B60G 1/04* (2006.01)

(52) U.S. Cl. ............ 280/124.11; 280/124.164; 280/124.17; 280/124.175; 267/52

(58) Field of Classification Search ......... 280/124.116, 280/124.128, 124.132, 124.164, 124.165, 280/124.17, 124.174, 124.175; 301/125; 267/52

See application file for complete search history.

(56) References Cited

U.S. PATENT DOCUMENTS

| 1,901,287 | A | * | 3/1933 | Corriveau | 267/52 |
| 2,129,656 | A | * | 9/1938 | Dougherty | 267/52 |
| 3,773,347 | A | * | 11/1973 | Traylor | 280/124.116 |
| 3,785,673 | A | * | 1/1974 | Harbers et al. | 280/124.101 |
| 4,141,428 | A | * | 2/1979 | Loeb | 180/349 |
| 4,643,406 | A | * | 2/1987 | Mounier-Poulat et al. | 267/52 |
| 4,732,371 | A | * | 3/1988 | Pflederer | 267/52 |
| 5,277,450 | A | * | 1/1994 | Henschen | 280/6.151 |
| 5,429,423 | A | * | 7/1995 | Pollock et al. | 301/124.1 |
| 6,122,948 | A | * | 9/2000 | Moses | 72/61 |
| 6,264,231 | B1 | | 7/2001 | Scully | |
| 6,585,331 | B1 | * | 7/2003 | Varela | 301/125 |

* cited by examiner

*Primary Examiner*—Paul N. Dickson
*Assistant Examiner*—Toan C. To
(74) *Attorney, Agent, or Firm*—Carlson, Gaskey & Olds

(57) ABSTRACT

A vehicle axle assembly is provided including an axle housing having legs extending along an axis. Each housing leg has a wall defining an interior cavity with the wall having a first locating feature formed therein. The first locating feature may be an indentation in the wall of the axle housing that may be in the shape of a concave dimple or a trough running transverse to the axis. The first locating feature may also be a protrusion instead of an indentation. A suspension component is secured to the housing leg by clamps. A suspension component includes a second locating feature of a complimentary shape to the first locating feature. The locating features cooperate to axially locate the suspension component on the housing leg preventing lateral movement.

8 Claims, 1 Drawing Sheet

AXLE HOUSING SUSPENSION SEAT ASSEMBLY

BACKGROUND OF THE INVENTION

This invention relates to a vehicle axle arrangement, and more particularly, the invention relates to an arrangement for attaching a suspension component to an axle housing that prevents lateral movement between the suspension component and the axle housing.

Vehicle axles are connected to a vehicle frame by suspension assemblies, which dampen harsh inputs from the roadway transmitted through the wheels. The suspension assembly is typically attached to the axle housing by clamps. The axle housing and suspension assembly must be sufficiently secured to one another such that they do not move relative to one another, particularly in the lateral direction. This secure connection must survive over time, and from the harsh inputs from the roadway.

Hollow axle housings are frequently used. A clamp assembly is used to secure the suspension assembly to the axle housing to generate a preload that may decrease during the operation of the vehicle. As the preload decreases, the axle may "walk" relative to the suspension assembly resulting in an undesirable alignment of the axle. Solid axle housings may be used for non-drive axle applications. For solid axles, lateral movement is not as great of a concern as for hollow axle housings because the preload does not decrease as greatly.

In the prior art, the suspension assembly and axle housing have been secured to one another using a variety of mechanisms. For example, a hole may be drilled into the axle housing and a dowel pin is inserted into the hole. A component of the suspension assembly includes a hole that receives an end of the dowel protruding from the axle housing to laterally locate the suspension component and axle housing relative to one another. In a similar arrangement, a pin is welded onto the top side of the axle housing and is received by a hole in the suspension component similar to the manner described above. The drawback with the dowel pin arrangement is that it sometimes comes loose during operation, and the suspension component can move along the axle housing. The drawback with the welded pin is that the welding operation adds significant cost to the manufacture of the axle. As an alternative to the two arrangements described above, the suspension component can be welded directly to the axle housing Welding however presents problems with servicing the suspension assembly or axle.

Therefore, what is needed is an improved axle housing suspension seat arrangement that is less costly and more effective for the duration of vehicle operation.

SUMMARY OF THE INVENTION AND ADVANTAGES

The present invention provides a vehicle axle assembly including an axle housing having legs extending along an axis. Each housing leg has a wall defining an interior cavity with the wall having a first locating feature formed therein. The first locating feature may be an indentation in the wall of the axle housing that may be in the shape of a concave dimple or a trough running transverse to the axis. The first locating feature may also be a protrusion instead at an indentation. A suspension component is secured to the housing leg by clamps. A suspension component includes a second locating feature of a complimentary shape to the first locating feature. The locating features cooperate to axially locate the suspension component on the housing leg preventing lateral movement. Furthermore, the arrangement of locating features described above may also be used for a solid axle.

The present invention provides a vehicle axle assembly including an axle housing having legs extending along an axis. Each housing leg has a wall defining an interior cavity with the wall having a first locating feature formed therein. The first locating feature may be an indentation in the wall of the axle housing that may be in the shape of a concave dimple or a trough running transverse to the axis. The first locating feature may also be a protrusion instead at an indentation. A suspension component is secured to the housing leg by clamps. A suspension component includes a second locating feature of a complimentary shape to the first locating feature. The locating features cooperate to axially locate the suspension component on the housing leg, preventing lateral movement. Furthermore, the arrangement of locating features described above may also be used for a solid axle.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
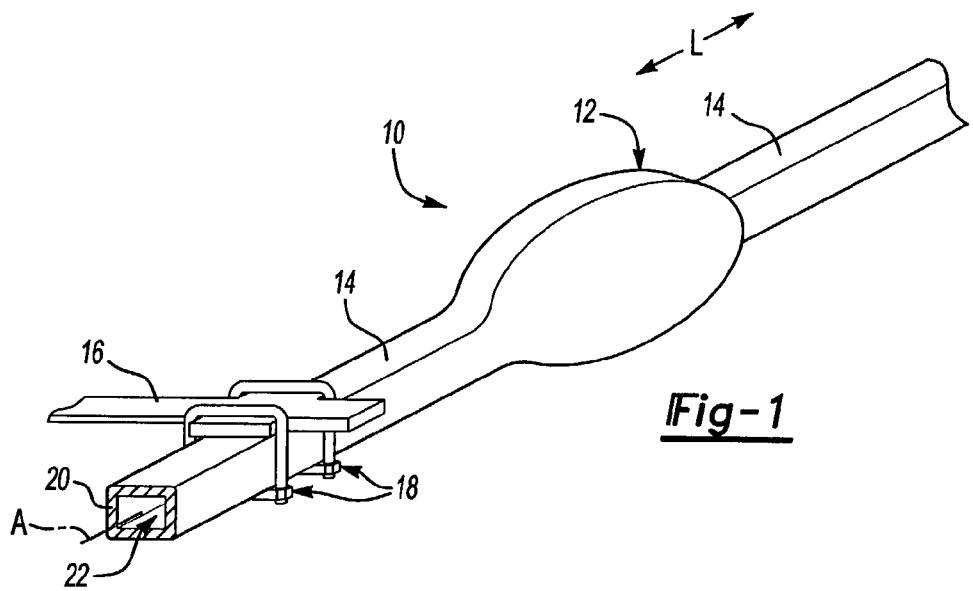
FIG. 1 is a perspective view of a vehicle suspension system.

A vehicle suspension system 10 is shown schematically in FIG. 1. The system 10 includes an axle 12 having opposing housing legs 14 extending longitudinally along an axis A. Although a hollow drive axle is shown, it will be understood from the description below that the present invention may be used with non-drive axles and solid axles.

A suspension component 16 of a suspension assembly is secured to the axle 12 with a clamp assembly 18. The suspension component 16 is shown very schematically. It should be understood that the component may be any device secured to vehicle structures other than axles. The clamp assembly 18 generates a preload that may decrease during vehicle operation. Accordingly, a mechanism is used to laterally locate the suspension component 16 relative to the housing leg 14 to prevent movement in the direction L throughout the operation of the vehicle.

Figure 2:
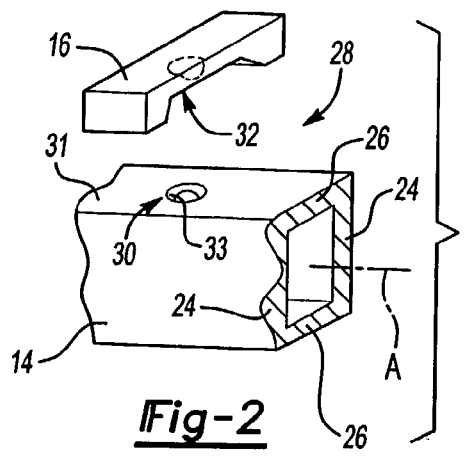
FIG. 2 is an exploded perspective view of the present invention axle housing and suspension component.

The housing leg includes a wall 20 defining a longitudinal interior cavity 22. The wall 20 may be constructed from one or more portions welded to one another, as discussed in more detail below. The wall 20 includes side walls 24 and lateral walls 26 extending between the side walls 24, as best shown in FIG. 2. The walls 24 and 26 form a contiguous, unbroken wall 20, which is shown by the cross-section in the figures. The wall 20 has a generally uniform thickness.

The axle housing leg 14 and suspension component 16 have complimentary locating features 28 that prevent undesired lateral movement between the housing leg 14 and suspension component 16 during operation of the vehicle. More specifically, the wall 20 may include a first locating feature 30, and the suspension component may include a second locating feature 32 complimentary in shape to the first locating feature 30. For example, the first locating feature 30 may be a dimple or concave depression formed in the exterior surface 31, and the second locating feature 32 may be a complimentary-shaped to the dimple 33.

Figure 3:
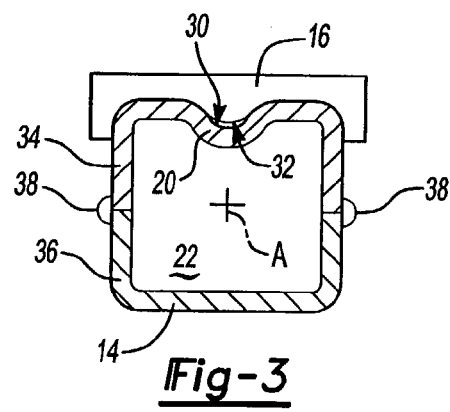
FIG. 3 is a cross-sectional view of the vehicle suspension system shown in FIG. 2.

Referring to FIG. 3, the first locating feature 30 is formed by the wall 20 so that no additional structure such as a welded pin is required. The first locating feature 30 may be constructed during the stamping operation in which the axle is formed. For example, the axle 12 may be formed by securing first 34 and second 36 housing portions to one another by a weld bead 38. During the stamping operation, the first locating feature 30 may be formed simultaneously. In this manner, no additional operations are required to provide the first locating feature 30. Alternatively, the first locating feature 30 may be formed into the housing leg 14 subsequent to any axle housing forming operation. In the case of a solid axle, the first locating feature 30 may be formed by a forming or drilling operation.

Figure 4:
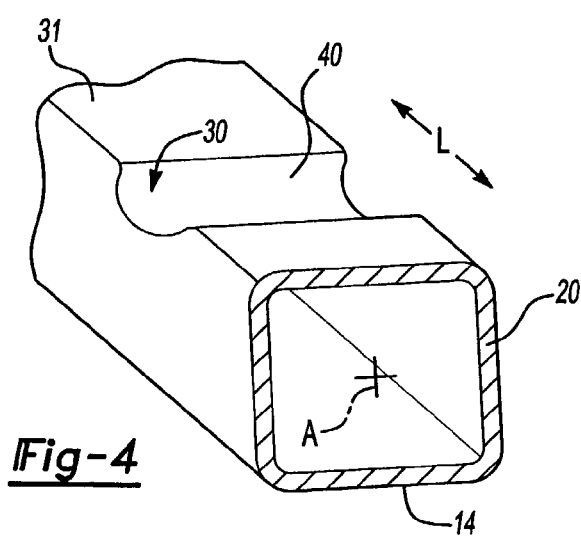
FIG. 4 is a perspective view of another configuration of a locating feature in the axle housing.

Referring now to FIG. 4, it will be appreciated that the locating features 28 may be of any suitable shape to prevent relative movement between the suspension component 16 and the housing leg 14 in the lateral direction L. The first locating feature 30 may be in the shape of a trough 40 plastically deformed into the wall 20 in a direction transverse to the axis A. The suspension component 16 includes a protrusion of a complimentary shape to the trough 40 (not shown) to form the second locating feature 32. Furthermore, it will be appreciated that the first locating feature 30 may be a protrusion instead of a depression, and the second locating feature 32 may be a complimentary shaped depression to receive the protrusion in the axle housing leg 14.

Figure 5:
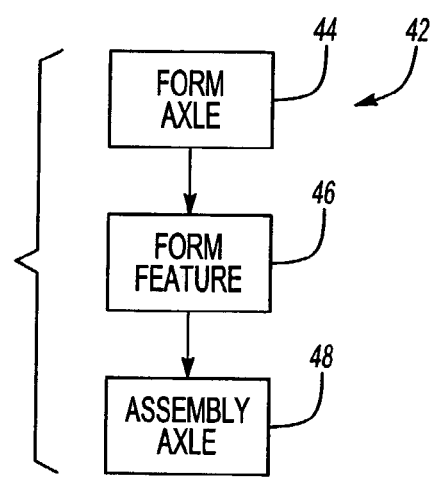
FIG. 5 is a flowchart of the present invention axle manufacturing process.

FIG. 5 depicts the present invention axle manufacturing process 42. The axle housing 12 is formed in the desired shape, as indicated at block 44. The axle housing may be formed by securing one or more housing portions to one another by a weld bead, or by any other suitable manufacturing process. The first complimentary locating feature 30 is formed into the axle housing, as indicated at block 46. The first locating feature may be formed simultaneously with the axle forming process of 44 or subsequent thereto. The suspension component 16 having a second locating feature 32 complimentary to the first locating feature 30 is assembled onto the axle 12, as indicated at block 48. A clamp assembly 18 may be used to secure the suspension component 16 to the axle 12.

As is clear from FIG. 1, the clamp assemblies 18 that secure the suspension component 16 to the axle 12 are such that the suspension component 16 extends beyond the clamp assemblies in a direction transverse to an axis of the axle 12. That is, the "suspension component" extends from the connection point at the clamp assemblies beyond the clamp assemblies and toward some other location.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A vehicle axle assembly comprising:
   an axle housing leg extending along an axis, said axle housing leg having a wall defining an interior cavity with said wall having a first locating feature formed therein; and
   a suspension component secured to said axle housing leg, said suspension component having a second locating feature complementary to said first locating feature, said second locating feature formed on an outer surface of said suspension component for axially locating said suspension component on said axle housing leg and resisting lateral movement of said suspension component relative to said axle housing leg along said axis, said suspension component being connected to said axle housing leg by a clamp assembly, said clamp assembly extending for a first distance in a direction transverse to said axis of said axle housing leg, and said suspension component extending beyond said first distance such that said suspension component extends beyond said clamp assembly in at least one direction.

2. The vehicle axle assembly according to claim 1, wherein said first locating feature is a depression in said wall.

3. The vehicle axle assembly according to claim 2, wherein said depression is a concave dimple.

4. The vehicle axle assembly according to claim 1, wherein said axle housing leg includes first and second housing portions secured to one another by a weld bead with said first and said second housing portions defining said wall.

5. The vehicle axle assembly according to claim 4, wherein said first locating feature is a depression in one of said first and said second housing portions.

6. The vehicle axle assembly according to claim 1, wherein said clamp assembly generates a preload on said axle housing leg.

7. The vehicle axle assembly according to claim 1, wherein said outer surface of said suspension component directly contacts an outer surface of said wall of said axle housing leg.

8. A vehicle axle assembly comprising:
   an axle housing leg extending along an axis, said axle housing leg having a wall defining an interior cavity with said wall having a first locating feature formed therein;
   a suspension component secured to said axle housing leg, said suspension component having a second locating feature complementary to said first locating feature, said second locating feature formed on an outer surface of said suspension component for axially locating said suspension component on said axle housing leg and resisting lateral movement of said suspension component relative to said axle housing leg along said axis;
   said first locating feature is a depression in said wall; and
   said depression is a trough arranged transverse to said axis and extending across a width of said axle housing leg.

* * * * *